J. F. RUFF.
CREAM TREATING DEVICE AND PROCESS.
APPLICATION FILED SEPT. 30, 1916.

1,222,892.

Patented Apr. 17, 1917.
3 SHEETS—SHEET 2.

Inventor
John F. Ruff,
By Pagelsen & Spencer
Attorneys

J. F. RUFF.
CREAM TREATING DEVICE AND PROCESS.
APPLICATION FILED SEPT. 30, 1916.

1,222,892.

Patented Apr. 17, 1917.
3 SHEETS—SHEET 3.

Witness
E. R. Barrett

Inventor
John F. Ruff,
By Pagelsen & Spencer
Attorneys

UNITED STATES PATENT OFFICE.

JOHN F. RUFF, OF PORT HURON, MICHIGAN.

CREAM-TREATING DEVICE AND PROCESS.

1,222,892.  Specification of Letters Patent.  Patented Apr. 17, 1917.

Application filed September 30, 1916. Serial No. 122,956.

*To all whom it may concern:*

Be it known that I, JOHN F. RUFF, a citizen of the United States, and residing at Port Huron, in the county of St. Clair and State of Michigan, have invented a new and Improved Cream-Treating Device and Process, of which the following is a specification.

The present invention relates to an apparatus for and process of treating cream whereby it is rendered smoother and finer grained, whereby it is pasteurized, and whereby its volume is increased. Cream so treated is particularly suitable for use in the manufacture of ice cream; but it is also suitable for use as coffee cream and in connection with breakfast foods; the apparatus may also be used to manufacture or emulsify a good sweet cream from sweet butter and whole milk, or skimmed milk, or from sweet butter and condensed milk (either liquid or powdered) and water; another characteristic of the apparatus is that treated cream left over after manufacturing any of the products noted can be churned as exhaustively and as readily as ordinary pasteurized cream.

The globules of butter fat contained in ordinary cream are relatively large, and the intervening space is filled with a liquid, mostly water, which, when frozen, gives to the cream a gritty texture—as is well known, this objection is increased with the lapse of time necessary to "age" the cream for use in the manufacture of ice cream. Again the bacteria usually present in sweet cream tend to develop in the course of the aging process and frequently render the cream unfit for use for the purpose stated. The present invention consists in a device whereby the cream is successively brought into intimate contact with a plurality of jets of steam moving at high velocities, together with means for excluding air or foreign matter from the cream and for cooling it as it passes from one jet to another. The invention further consists in the details of construction shown, described and claimed herein; and it also consists in a process whereby the cream is both rendered smoother and pasteurized. It furthermore consists in an apparatus whereby cream suitable for the manufacture of ice cream may be made from sweet butter and whole milk or skimmed milk, or from sweet butter and condensed milk and water.

Figure 1:
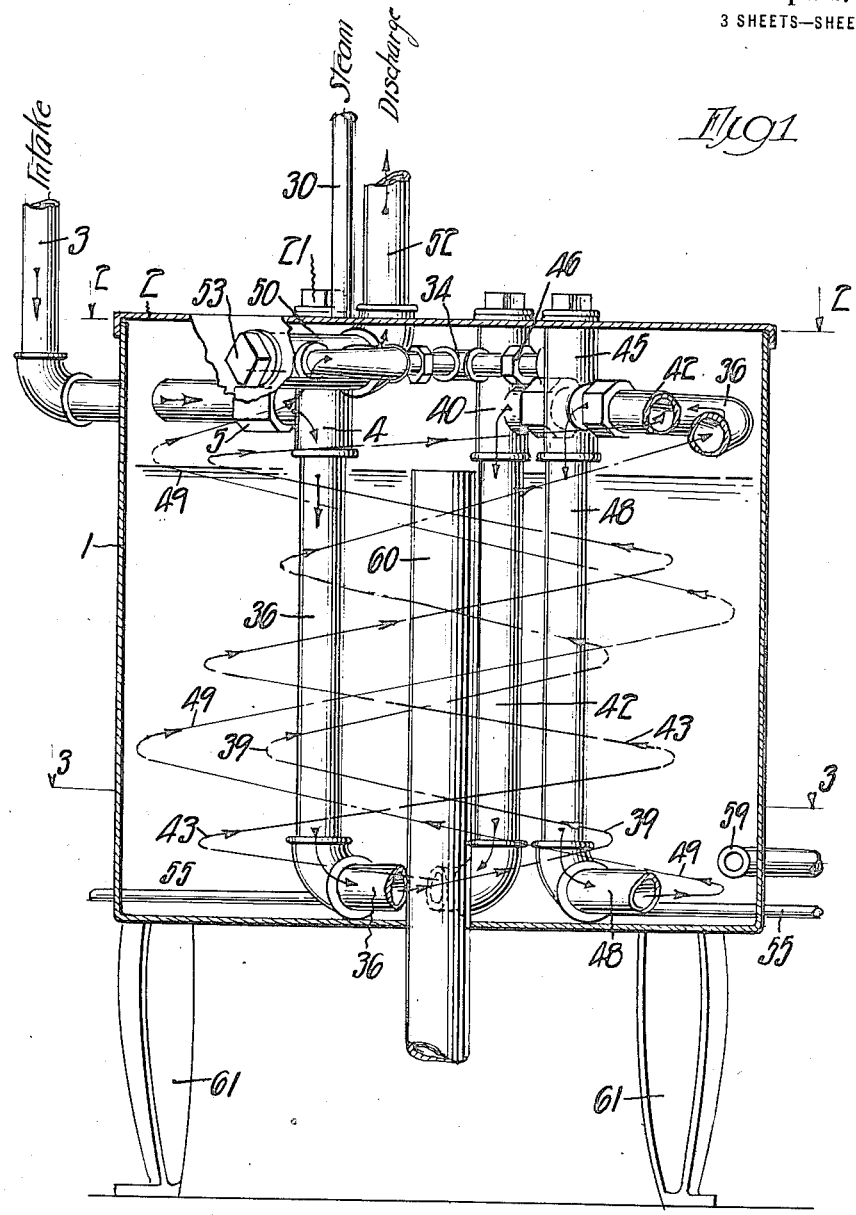
Figure 2:
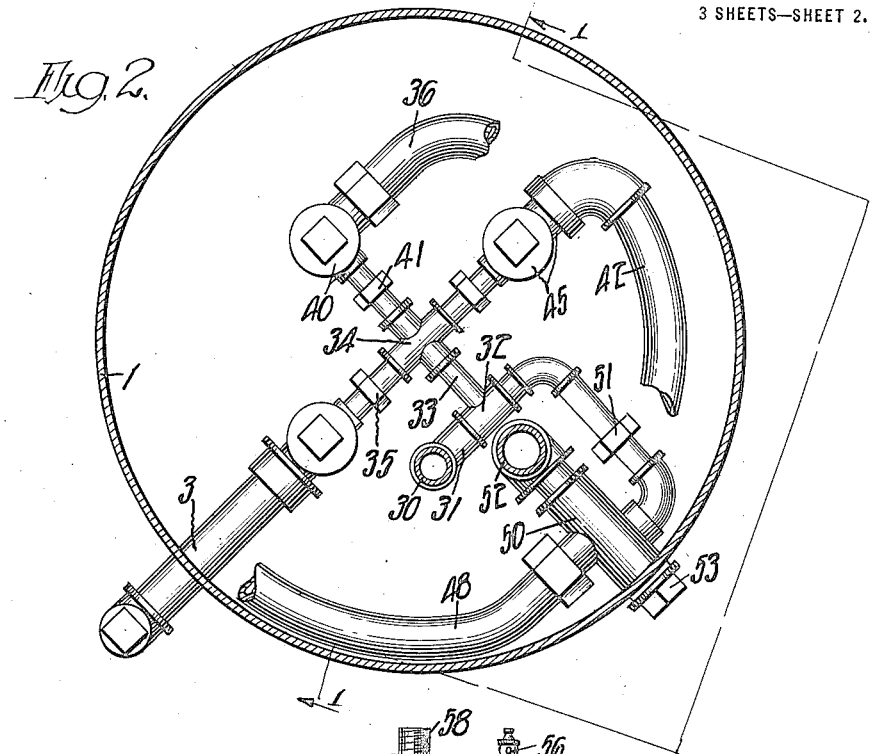
Figure 3:
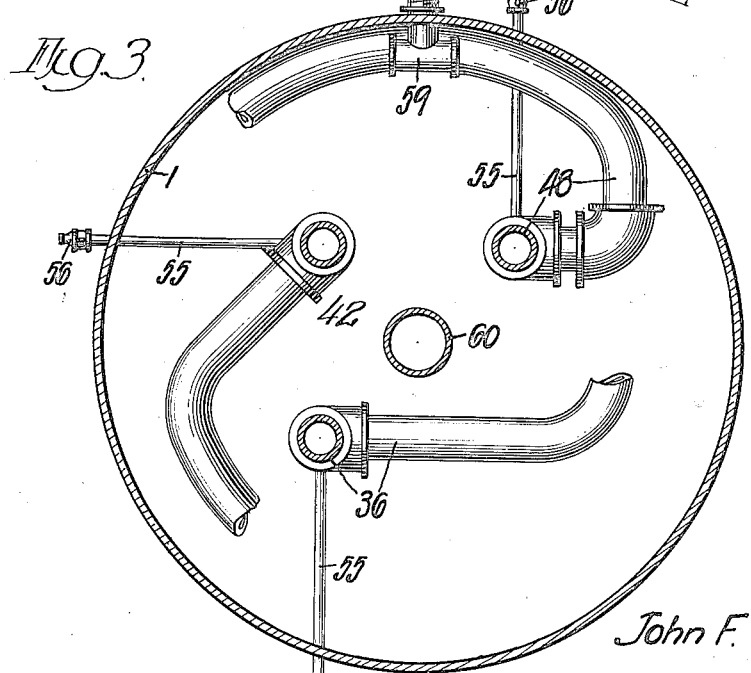
Figure 4:
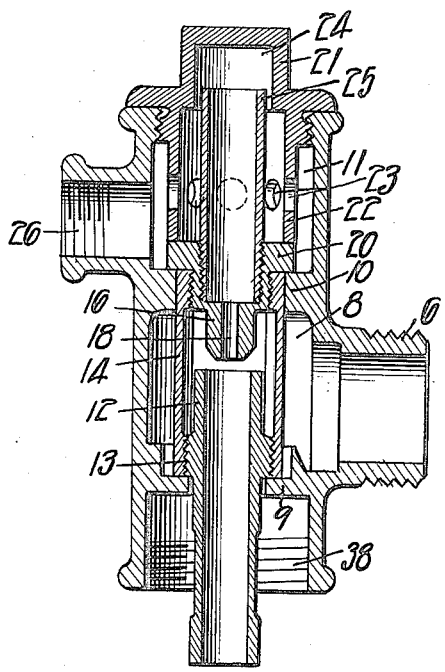
Figure 5:
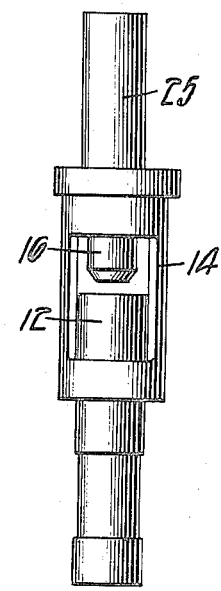

Figure 1 is a side view, parts being broken away, looking in the direction indicated by the arrows and line 1—1 of Fig. 2 and showing a preferred embodiment of the invention. Figs. 2 and 3 are sections on about the lines 2—2 and 3—3, respectively, of Fig. 1. Fig. 4 is a longitudinal section through a preferred form of jet. Fig. 5 is a side elevation of the jet nozzle.

The embodiment of the invention shown comprises a substantially cylindrical casing 1 having its upper end closed by a cover 2, that may be flat as shown or may have its central portion arranged higher than the rim. Entering the upper portion of the casing, preferably at one side thereof, is a cream supply pipe 3 (having a gate or other valve, not shown) which communicates with a jet or comminuting device 4 by means of a coupling 5 that screws onto a threaded intake flange 6 (Fig. 4) thereof.

The jet 4 is somewhat similar in action, in so far as its material handling function is concerned, to an injector and includes a receiving chamber 8 for the cream, the ends of the chamber being determined by the cross wall 9 and the dividing wall 10, the latter of which also constitutes an end wall for a steam receiving chamber 11. The walls 9 and 10 have alined perforations (that in the former being smaller than that in the latter) in which are received the removable nozzle elements shown in Fig. 5. These elements include the discharge nozzle tube 12 which is screw-threaded at 13 into the skeleton carrier-tube 14, one end of which bears upon the cross wall 9. At its opposite end the tube 14 fits in the perforation in the dividing wall 10 and is threaded to receive the removable steam nozzle tip 16 having a discharge opening 18 of small cross-section. As the tip 16 is tapered and extends in proximity to the adjacent end of the tube 12, the size of the annular passage through which the cream is admitted from the chamber 8 to the tube 12 may be accurately determined by turning the latter in the carrier 14. It will be observed that the tip 16 includes an annular flange 20 which extends out beyond the carrier 14 into bearing engagement with the wall 10. The other end of the steam receiving chamber is closed by a threaded plug 21 having a tubular flange 22 that bears upon the flange 20 and holds the latter to its seat as well as the lower end of the carrier 14 in close bearing relation to the wall 9. The flange 22 is provided with a series of perforations 23 and the plug is preferably counterbored at 24 to receive the end of a tube 25 that may be screwed into the tip 16. The fitting 4, while located as a whole inside of the casing, has its plug 21 projecting therefrom, consequently when the plug is removed, the tube 25 may be grasped by the fingers and all the parts shown in Fig. 5 may be withdrawn for cleaning purposes or for adjustment. Steam admitted to the chamber 11 through the perforated threaded boss 26 passes through the openings 23, the counterbore 24, the tube 25 and the passage 18, from which it is discharged at high velocity into the tube 12, thus creating a partial vacuum at the entrance to the latter. Cream thus sucked into the tube 12 from the pipe 3 and struck by the steam, has its globules of butter fat broken up and reduced in size; at the same time the temperature of the cream is raised. To obtain the best results, the opening 18 is preferably made small. Passage of the cream through a single jet is, however, insufficient to secure either the desired comminution of the globules or a temperature high enough for pasteurization.

As shown, steam is conducted to the boss 26 from a supply pipe 30 by means of the nipple 31, T 32, nipple 33, cross 34 and union 35 and associated nipples (Fig. 2). From the discharge tube 12 the cream is driven into a pipe 36 that is screwed into the jet 4 at 38 and leads directly downward substantially to the bottom of the casing and from there rises along the helical line 39, as indicated by the arrows, and enters a jet or comminuting device 40 (a duplicate of the jet 4) to which steam is conducted from the cross 34 by a union 41 and associated nipples. The steam from this jet drives the cream directly downward through the pipe 42 to the bottom of the casing from which it rises along the line 43 to a third jet 45 that receives its steam from the cross 34 through the union 46; again being struck by the steam, the cream is driven downward through the pipe 48 to the bottom of the casing from which it rises along the helical line 49 to a fourth jet 50, to which steam is supplied from the T 32 through union 51 and associated fittings. The jet 50 delivers the cream to a suitable receiver (not shown) through a pipe 52 that extends upwardly from the casing, and from this pipe the cream passes to a suitable cooling device (not shown). It will be seen that the jet 50 lies at substantially right angles to the jets 4, 40 and 45, and has its plug 53 projecting through the side wall of the casing to afford access for cleaning purposes, and that the plugs of the jets 40 and 45, like that of the jet 4, project above the cover 2. By taking out the jet nozzles and replacing the plugs, a large volume of live steam may be blown through the pipes, which will render them perfectly clean and sterilize them after each operation.

Each of the coils 36—39, 42—43, and 48—49 is provided at its lowest portion with a drain pipe 55 having a drip cock 56. Cooling water is continually circulated through the casing by means of the intake nipple 58 (that preferably leads to a T 59 on the interior of the casing) and the overflow pipe 60, the upper end of which is slightly below the steam conduits 32—33, 34, etc. The casing may be mounted on legs 61.

Operation.

Assuming that the cream fed by the pipe 3 is at a temperature of say 110° F., that the dimensions of the parts are such that the cream is raised in temperature by each of the jets 4, 40, 45 and 50 substantially twenty five degrees (these figures merely indicate good practice), and that each of the coils 36—39, 42—43 and 48—49 cools the cream fifteen degrees, it will be seen that the cream issues from the jet 4 at 135° F., that it is delivered to the jet 40 at 120° F., and that its net increase in temperature for each of the jets 40 and 45 is also 10°—in other words it reaches the jet 50 at 140° F. The additional 25° in temperature imparted to it by the latter raises it to 165°, which, because of the intimate commingling of the steam and cream, is sufficient to insure thorough pasteurization. Because of the successive intimate applications of the steam to the cream, the final product is rendered much smoother and finer in constituency as well as increased in volume, and is made capable of readily undergoing the aging process.

The same general operation takes place when the apparatus is used with a mixture of butter and milk, or of butter and condensed milk and water, it being understood that these mixtures are heated, before being delivered to the apparatus, to a temperature sufficient to melt the butter, and the cream so produced possesses substantially the same desirable characteristics as that made from fresh cream.

The word "cream," as used in the claims, is, for lack of a more convenient term, intended to cover either cream (in the usual sense of the word) or such mixtures of butter and other products as has been pointed out.

The details of construction may obviously be changed within wide limits without departing from the spirit of the invention, and I do not, therefore, wish to be limited except as indicated by the following claims.

I claim:—

1. Means for comminuting cream comprising a closed conduit through which it is passed, means for supplying cream to the conduit, said conduit including a plurality of steam jets and means for cooling said conduit between said jets.

2. Means for comminuting cream comprising a casing, means for maintaining a predetermined level of cooling liquid therein, a conduit, means for supplying cream thereto, said conduit having portions located above the cooling liquid and other portions located below said level, said first mentioned portions each including a steam jet through which the cream is passed and by which it is delivered into the corresponding one of the last named portions.

3. Means for comminuting cream comprising a casing, means for maintaining a predetermined level of cooling liquid therein, a conduit, means for supplying cream thereto, said conduit having portions located above the cooling liquid and other portions located below said level, said first mentioned portions each including a steam jet through which the cream is passed and by which it is delivered into the corresponding one of the last named portions, the heating capacity of the first named portions being greater than the cooling capacity of the last named portions whereby the temperature of the cream is raised.

4. Means for comminuting and pasteurizing cream comprising a closed conduit through which it is passed, means for supplying cream to the conduit, said conduit including a plurality of steam jets and means for cooling said conduit between said jets, the heating capacity of the steam jets being sufficiently greater than the cooling capacity of the cooling means to insure the cream being thoroughly pasteurized.

5. Means for treating dairy products comprising a closed conduit through which said products are passed, means for supplying said product to the conduit, said conduit including a plurality of alternately arranged steam jets and cooling means.

6. Means for treating dairy products comprising a closed conduit through which said products are passed, means for supplying said product to the conduit, said conduit including a plurality of alternately arranged steam jets and cooling means, whereby the globules of butter fat initially found in the product are broken up, the heating capacity of the steam jets being sufficiently greater than the cooling capacity of the cooling means to insure pasteurization.

7. Means for treating cream including a casing, means for supplying cooling liquid thereto, a conduit passing through said casing, means for supplying cream to the conduit, said conduit including a plurality of steam jets alternating with a plurality of cooling coils, and means, located above the level of the cooling liquid, for supplying steam to the jets.

8. Means for comminuting cream comprising a casing, means for maintaining a predetermined level of cooling liquid therein, a conduit, means for supplying cream thereto, said conduit having portions located above the cooling liquid and other portions located below said level, said first mentioned portions each including a steam jet through which the cream is passed and by which it is delivered into the corresponding one of the last named portions, and means for draining the portions of the conduit which are below the level of the cooling liquid.

9. Means for treating cream including a casing, means for supplying cooling liquid thereto, a conduit passing through said casing, means for supplying cream to the conduit, said conduit including a plurality of steam jets alternating with a plurality of cooling elements, said conduit also including another steam jet whereby the cream is delivered from the casing without passing through a cooling element.

10. Means for treating cream including a casing, means for supplying cooling liquid thereto, a conduit passing through said casing, means for supplying cream to the conduit, said conduit including a plurality of steam jets alternating with a plurality of cooling elements, one of said jets having a plug projecting from the casing whereby access may be had to the interior thereof for cleaning purposes.

11. Means for treating cream including a casing, means for supplying cooling liquid thereto, a conduit passing through said casing, means for supplying cream to the conduit, said conduit including a plurality of steam jets alternating with a plurality of cooling elements, one of said jets having a plug projecting from the casing whereby access may be had to the interior thereof for cleaning purposes, said jet also including a steam discharge nozzle and a combined cream-and-steam discharge nozzle arranged to be removed as a whole from the jet when the plug is removed.

12. Means for treating cream including a casing, a conduit extending through said casing, means for supplying cream to the conduit, means for maintaining a desired level of cooling liquid in the casing, said conduit including a steam jet having a plug projecting from the casing whereby access to the interior may be had for inspection purposes, and a cooling element to which the cream is delivered, said element extending into the cooling liquid.

13. The process of treating cream which consists in successively subjecting it to the comminuting action of jets of steam and cooling it between said comminuting actions whereby the size of the globules of butter fat is reduced.

14. The process of pasteurizing and comminuting cream which consists in passing it through a steam jet to raise its temperature and break up its constituent globules, then cooling it a less amount than its rise of temperature in the steam jet, and finally passing it through another steam jet whereby its globules are further broken up and whereby it is pasteurized.

15. The process of treating cream which consists in alternately passing it through a plurality of steam jets to raise its temperature to that necessary for pasteurization and to break up its constituent globules, and cooling it between its passage through successive jets sufficiently to reduce its temperature less than said temperature is raised by the corresponding jets.

16. A steam jet for comminuting cream including a cream chamber and a steam chamber, a perforated dividing wall between said chambers, the cream chamber also having an end wall perforated in alinement with the perforation in the dividing wall, the end of the steam chamber opposite the dividing wall being closed by a removable plug, and a combined steam nozzle, cream intake, cream delivery tube and finger piece removable through the end wall of the steam chamber when the plug is removed.

17. A steam jet for comminuting cream including a cream chamber and a steam chamber, a perforated dividing wall between said chambers, the cream chamber also having an end wall perforated in alinement with the perforation in the dividing wall, the end of the steam chamber opposite the dividing wall being closed by a removable plug, and a combined steam nozzle, cream intake and cream delivery tube removable through the end wall of the steam chamber when the plug is removed.

18. A steam jet for comminuting cream including a cream chamber and a steam chamber, a perforated dividing wall between said chambers, the cream chamber also having an end wall perforated in alinement with the perforation in the dividing wall, the end of the steam chamber opposite the dividing wall being closed by a removable plug, and a combined steam nozzle, cream intake and cream delivery tube removable through the end wall of the steam chamber when the plug is removed, said plug having a tubular flange whereby said combined steam nozzle, cream intake and cream delivery tube is held seated on both the perforated walls when the plug is in normal position.

JOHN F. RUFF.